S. A. COWART.
SELF LOCKING MECHANISM FOR STEERING WHEEL SHAFTS OF AUTOMOBILES.
APPLICATION FILED APR. 23, 1915.
1,221,688.
Patented Apr. 3, 1917.
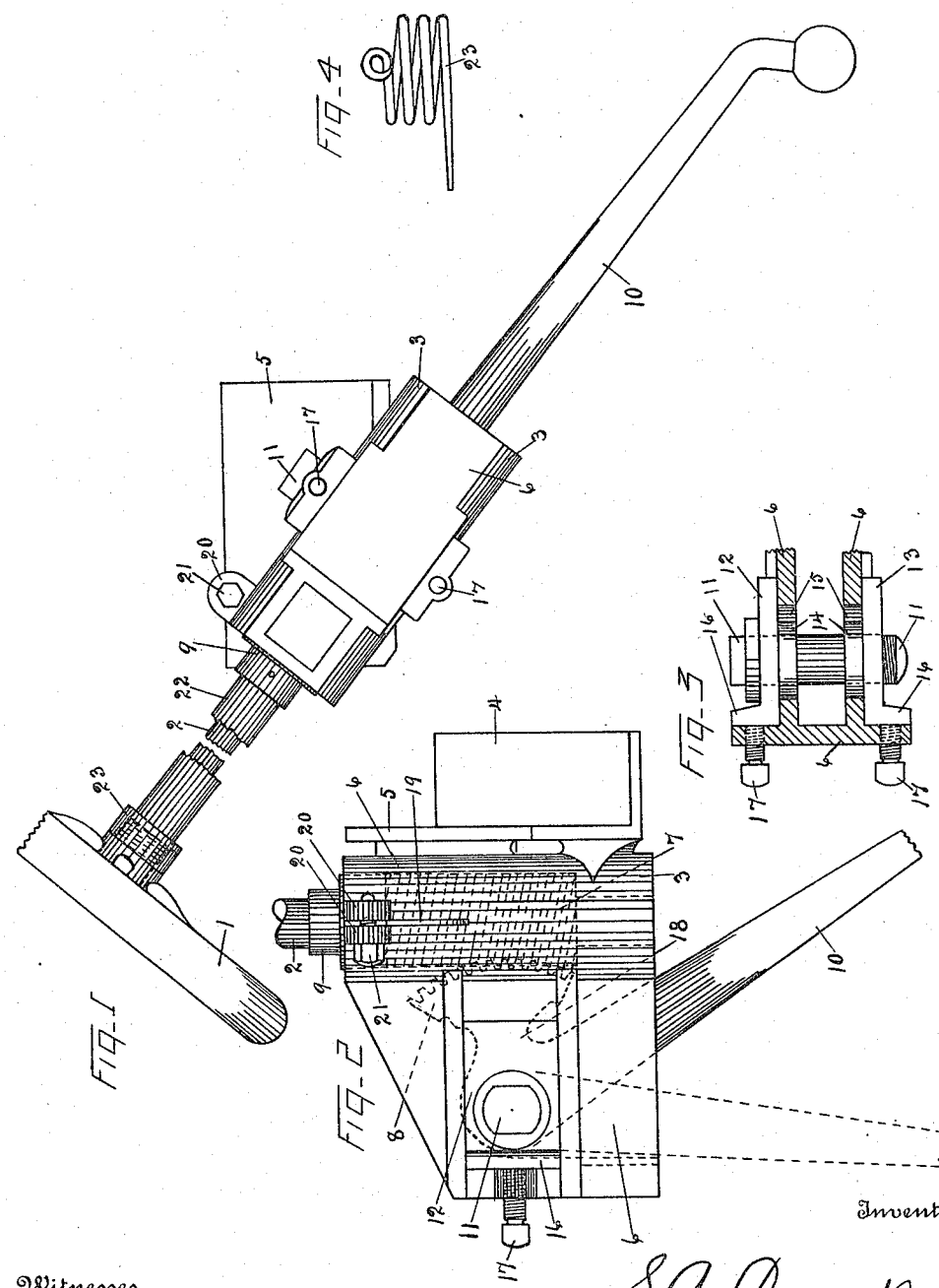

UNITED STATES PATENT OFFICE.

STEPHEN A. COWART, OF MIDLOTHIAN, TEXAS.

SELF-LOCKING MECHANISM FOR STEERING WHEEL-SHAFTS OF AUTOMOBILES.

1,221,688.  Specification of Letters Patent.  Patented Apr. 3, 1917.

Application filed April 23, 1915. Serial No. 23,291.

*To all whom it may concern:*

Be it known that I, STEPHEN A. COWART, a citizen of the United States, residing at Midlothian, in the county of Ellis and State of Texas, have invented certain new and useful Improvements in Self-Locking Mechanism for Steering Wheel-Shafts of Automobiles, of which the following is a specification.

My invention relates to safety attachments for the steering wheel shaft of motor vehicles and more particularly to a safety locking device for the steering wheel shaft; and the object is to provide a locking mechanism which will not interfere with the steering of the vehicle, but which will prevent the steering mechanism from veering out of position which veering causes the vehicle to change direction. The object is to provide a safety locking device for the steering wheel shaft which will hold the steering crank in the position in which it is set until the operator changes the direction. Other objects and advantages will be fully explained in the following description and the invention will be more particularly pointed out in the claims.

Reference is had to the accompanying drawings which form a part of this application.

Figure 1 is a side elevation of the safety attachment, showing the relative position of the attachment to the steering wheel shaft. Fig. 2 is a plan view of the same, the attaching flanges being shown in perspective. Fig. 3 is a broken sectional view, showing the manner of adjusting the crank attaching brackets or bearing blocks. Fig. 4 is a detail view of the spring for restoring the steering shaft to normal position.

Similar characters of reference are used to indicate the same parts throughout the several views.

The improved locking device is shown in connection with an ordinary steering wheel 1 and its shaft 2. The shaft 2 terminates in a bearing 3 which may be cast integral with a bracket having a horizontal member 4 and a vertical member 5 for attaching the bearing to a vehicle frame in the usual manner. The bearing 3 is a part of a casing 6 which incloses a worm gearing consisting of a pinion 7 and a segmental cog 8. A hollow plug 9 screwed into the casing 6 constitutes another bearing for the shaft 2. The worm pinion 7 may be formed integral with the shaft 2. The steering crank 10 is pivotally connected to the casing 6 by a bearing bolt 11 which is mounted in adjustable blocks 12 and 13. The blocks 12 and 13 have bosses 14 which project into openings 15 in the walls of the casing 6, the openings 15 being large enough for allowing the bosses to move therein for adjusting purposes. The blocks 12 and 13 have outwardly projecting flanges 16 against which set bolts 17 bear for adjusting the blocks 12 and 13. The bolt 11 passes through the block 12 and screws into the block 13. The plug 9 can be screwed more or less into the casing 6 for adjusting the worm pinion 7. The segmental gear teeth 8 are formed on an arm 18 which is integral with the bearing of the steering crank 10. The casing 6 is slitted at 19 and provided with ears 20 integral therewith so that the casing 6 can be adjusted to the plug bearing 9 by a bolt 21. The shaft 2 is provided with the usual casing 22. The wheel 1 is restored to normal position by a spiral spring 23, one end of which is attached to the shaft 2 and the other end attached to the casing 22.

In operation, the steering wheel is used to set the gearing for running the car in the desired direction which direction may be straight or curved. The improved locking device will hold the crank 10 rigidly as set and the crank cannot be moved by strain on the crank caused by obstructions because the teeth on the worm segment 8 will be pushing substantially at right angles to the teeth of the pinion 7. But the pinion 7 can be used to set the crank 10 at whatever position may be desirable and this can be easily done. This avoids the necessity of a constant holding of the steering wheel. A car can be made to run in a straight line or in a circle without even holding the steering wheel.

What I claim, is, —

1. A self-locking steering mechanism comprising a single piece housing having two compartments communicating with each other, a steering shaft journaled in one compartment and a worm pinion rigid therewith, a segmental worm gear mounted in the other compartment and having a steering crank integral therewith, and an adjustable bearing for said segmental gear and crank consisting of a pivot bolt or shaft and adjustable bearing blocks having bosses projecting within said housing, said housing having elongated openings to receive said bosses, and means connected with said housing for holding said bearing blocks at different adjustments.

2. A self-locking steering mechanism comprising a single piece housing having two compartments communicating with each other, a steering shaft carrying a worm pinion journaled in one compartment and a steering crank having a segmental worm gear rigid therewith mounted in the other compartment, and adjustable bearing members for said worm gear consisting of a pair of blocks mounted on the outside of said housing having bosses projecting in said housing, said housing having elongated openings for movement of said bosses, and having guiding flanges for said bearing blocks, and set screws connected with said housing for adjusting said bearing blocks.

In testimony whereof, I set my hand in the presence of two witnesses, this 9th day of April, 1915.

STEPHEN A. COWART.

Witnesses:
 A. L. JACKSON,
 J. W. STITT.

Copies of this patent may be obtained for five cents each, by addressing the "Commissioner of Patents, Washington, D. C."